United States Patent
Klohr et al.

(10) Patent No.: US 6,939,960 B2
(45) Date of Patent: Sep. 6, 2005

(54) CELLULOSE ETHERS

(75) Inventors: Erik-Andreas Klohr, Walsrode (DE); Jörg Neubauer, Walsrode (DE); Wolfgang Koch, Bomlitz (DE); Klaus Szablikowski, Walsrode (DE); Detmar Redeker, Walsrode (DE); Wolfgang Wagenknecht, Teltow (DE); Fritz Loth, Teltow (DE)

(73) Assignee: Wolff Walsrode AG, Walsrode (DE)

( * ) Notice: Subject to any disclaimer, the term of this patent is extended or adjusted under 35 U.S.C. 154(b) by 6 days.

(21) Appl. No.: 10/261,332

(22) Filed: Sep. 30, 2002

(65) Prior Publication Data

US 2003/0032798 A1 Feb. 13, 2003

Related U.S. Application Data

(63) Continuation of application No. 09/446,998, filed as application No. PCT/EP98/04061 on Jul. 1, 1998, now Pat. No. 6,482,940.

(30) Foreign Application Priority Data

Jul. 14, 1997 (DE) .......................................... 197 30 090

(51) Int. Cl.⁷ .............................................. C08B 11/00
(52) U.S. Cl. .......................................... 536/84; 536/56
(58) Field of Search ..................................... 536/84, 56

(56) References Cited

U.S. PATENT DOCUMENTS

| 3,447,939 A | 6/1969 | Johnson ...................... 106/135 |
| 4,145,532 A | 3/1979 | Franks et al. .................. 536/56 |
| 4,196,282 A | 4/1980 | Franks et al. .................. 536/56 |
| 5,626,810 A | 5/1997 | Zikeli et al. ................ 264/187 |
| 6,482,940 B1 * | 11/2002 | Klohr et al. .................. 536/84 |

FOREIGN PATENT DOCUMENTS

| DE | 207380 | 2/1984 |
| EP | 452610 | 10/1991 |
| FR | 1546858 A * | 11/1968 |

OTHER PUBLICATIONS

Seneker et al, Polymeric Material Science & Engineering, 52 (month unavailable), 1985, pp. 39–43, "Utilization of N–Methylmorpholine N–Oxide in Delineation of substituent Placement in Carbohydrate, Polymers".

* cited by examiner

Primary Examiner—James O. Wilson
Assistant Examiner—Everett White
(74) Attorney, Agent, or Firm—James C. Gil; James R. Franks

(57) ABSTRACT

A cellulose ether that is predominantly substituted in the C3 position of the anhydroglucose unit of the cellulose is described. In an embodiment of the present invention, the partial degree of substitution in the C3 position of the cellulose ether is $\geq 60\%$, based on the total degree of substitution.

2 Claims, No Drawings

CELLULOSE ETHERS

CROSS REFERENCE TO RELATED PATENT APPLICATION

The present patent application is as continuation of and claims the right of priority under 35 U.S.C. §120 to U.S. Pat. application Ser. No. 09/448,998, which was filed on Dec. 30, 1999, now U.S. Pat. No. 6,482,940, which is a 371 of PCT/EP98/04061 filed Jul. 1, 1998.

The invention relates to novel cellulose ethers and to a process for the preparation thereof by reaction of cellulose dissolved in N-methylmorpholine-N-oxide monohydrate (NMMNO) with alkylation reagents under homogeneous reaction conditions. The products prepared by this process are characterised by a special substitution pattern and novel properties.

BACKGROUND OF THE INVENTION

The industrial preparation of cellulose ethers takes place nowadays exclusively under heterogeneous reaction conditions whereby cellulose is initially activated with concentrated alkali liquor and then reacted with alkyl halides or epoxy alkyl compounds at elevated temperature. Activation is required on the one hand to loosen the partially crystalline structure of the cellulose and to increase the accessibility of the hydroxyl groups, and on the other hand to polarise the hydroxyl groups of the cellulose to the extent that nucleophilic substitution of the halogen on the alkyl halide or ring cleavage in the case of epoxides followed by addition becomes possible. In order to improve the uniformity of substituent distribution and hence to improve the product properties, the reaction is often carried out in the presence of inert organic solvents such as, e.g. 2-propanol.

Disadvantages of carrying out the reaction heterogeneously throughout the process are that:
1) a high alkali concentration is required to swell and activate the cellulose even in reactions requiring only catalytic quantities,
2) a decrease in the molecular weight and a high salt load during neutralisation of the liquor is consequently unavoidable,
3) it is not possible to prepare completely soluble and yet high-viscosity cellulose ethers with low degrees of substitution,
4) as the morphological structure of the cellulose is largely maintained, it is not possible to achieve a satisfactory uniform etherification along and between the polymer chains, and unsubstituted monomer units always occur in addition to di- and tri-substituted anhydroglucose units, even in the case of soluble, relatively highly substituted products,
5) solubility properties, thermal stability or compatibility of the cellulose ethers with respect to ionic or nonionic substances of a low or high molecular weight nature are frequently unsatisfactory and restrict the fields of application,
6) a regioselective homogeneous derivatisation of free OH groups in certain positions of the anhydroglucose unit is not possible.

In order to overcome such disadvantages due to the heterogeneous synthesis, various aqueous and non-aqueous cellulose solvent systems have been used in recent decades for the etherification of cellulose in the homogeneous phase. Apart from achieving a more uniform substituent distribution, the aim was at the same time to provide access to soluble cellulose ethers with longer-chain and extensive substituents. Proposed solvent systems which are sufficiently stable under the required reaction conditions and are also inert towards the reagents to be used were mainly quaternary ammonium bases (U.S. Pat. No. 2,087,549), mixtures of sulfur dioxide/dimethylamine/dimethylsulfoxide (A. Isogai, A. Ishizu, J. Nakano: J.Appl. Polymer. Sci. 31(1986) p. 341–352), mixtures of dimethylsulfoxide/paraformaldehyde (U.S. Pat. No. 4,024, 335), mixtures of N,N-dimethylacetamide/lithium chloride (U.S. Pat. No. 4,278,790) and N-methylmorpholine-N-oxide (NMMNO) (reviews in: Methoden der Organischen Chemie (Houben-Weyl), vol. E20-Makromolekulare Stoffe, eds. H. Bartel and J. Falbe, Georg Thieme Verl., Stuttgart-New York, 1987, p. 2086–2093 and B. Philipp, B. Lukanoff, H. Schleicher, W. Wagenknecht: Z. Chem. 26(1986)2, p. 50–58).

These cellulose solvent systems have been unable to become established hitherto on an industrial scale, in some cases because of the limited dissolving power, particularly with respect to high molecular weight starting celluloses and relatively high cellulose concentrations, the difficulty of recovering the components, or for cost reasons, despite the wide possibilities of derivatisation.

The most promising cellulose solvent for industrial use has recently proved to be NMMNO, though commercial interest has been shown almost exclusively in forming cellulose to fibres and films (U.S. Pat. No. 3,447,956, U.S. Pat. No. 4,196,282, EP 452610, WO 95/11261).

Homogeneous etherification reactions of cellulose in melt solutions of cyclic amine oxides, particularly of NMMNO, in the presence of organic solvents, preferably DMSO, as diluent to cyanoethylcellulose or cellulose oxyethyl methyl ketone using the vinyl compounds acrylonitrile and methyl vinyl ketone were described for the first time by Johnson (U.S. Pat. No. 3,447,939), operations being carried out in a disadvantageous manner with very low cellulose concentrations, extremely high reagent use quantities and high reaction temperatures which promote the decomposition of the N-oxide. In the case of cyanoethylation, the use of benzyltrimethylammonium hydroxide is mentioned as etherification catalyst. In all the reactions mentioned here, strongly coloured cellulose derivative solutions were initially obtained. The reagent yields were extremely low and the resulting cellulose derivatives were degraded to a greater or lesser extent, for which reason this process principle and the products obtained herewith appear to be unsuitable for industrial use.

It was later found that by adding various stabilisers such as, e.g., propyl gallate (EP-B 0 047 929), phenylpropionates, thioethers or disubstituted phenylene diamine (DE-OS 42 446 099), phosphates or phosphonates (WO 83/044415), basic substances (DD 158656), DD 218104), particularly amines (U.S. Pat. No. 4,290,815), degradation of cellulose during dissolution in NMMNO and the decomposition of NMMNO itself can be largely prevented.

The preparation of high-swelling carboxymethyl celluloses with a low degree of substitution by reacting cellulose with monochloroacetic acid or Na monochloroacetate in the NMMNO system using sodium hydroxide solution as base is claimed in DD-PS 207 380. It is not mentioned here that the system has a strong tendency to coagulate when sodium hydroxide solution is added, and that non-uniformly substituted products are obtained. This coagulating effect of sodium hydroxide solution is also observed with most of the other above-mentioned non-aqueous cellulose solvents, which is a decided disadvantage of these well known so-called homogeneous etherification processes. The use of powdered caustic soda (U.S. Pat. No. 4,278,790), Na alcoholate and NaH (A. Isogai, A. Ishizu, J. Nakano: J. Appl. Polymer Sci. 29(1984) p. 2097–2109) as catalyst in the lithium chloride/dimethyl acetamide system did not bring the desired success either and led to heterogeneities during the reaction to partially substituted derivatives. The catalytic effect of NMMNO during the hydroxyalkylation of mannan as a model substance was analysed by Seneker and Glass (Polymeric materials science and engineering 52 (1985) p. 39–43) and a preferential substitution on the C-6 OH group was assumed for cellulose.

SUMMARY OF THE INVENTION

Starting from the disadvantages described of the well known processes for the etherification of cellulose, the aim of the present invention was to develop a process for the preparation of cellulose ethers under homogeneous reaction conditions and using NMMNO as solvent or reaction medium, which process makes it possible to prepare cellulose ethers economically in this system and at the same time provides products with novel properties. In particular, products with a specific substitution pattern, for example, a largely uniform regioselective substitution of the various OH groups of the anhydroglucose ring of cellulose were to be obtained.

According to the invention, it is proposed that cellulose initially be dissolved in NMMNO with the addition of suitable stabilisers and that the etherification reaction be carried out in the presence of a solid phase catalyst. The preparation of the cellulose solutions takes place preferably in a known way (U.S. Pat. Nos. 4,145,532, 4,196,282, EP 452610, WO 95/11261) by dissolving the cellulose in a melt of NMMNO at temperatures from 85 to 115° C. The cellulose material is usually stirred into an aqueous solution of NMMNO at room temperature and heated to about 85 to 115° C. whilst simultaneously distilling the water under reduced pressure. The cellulose concentration is advantageously 2 to 20%, preferably 3 to 15%, depending on the degree of polymerisation of the cellulose used.

In accordance with the present invention, there is also provided a cellulose ether having a specific substitution pattern, wherein the cellulose ether has a partial degree of substitution in the C3 position of the anhydroglucose unit of the cellulose of $\geq 60\%$, based on the total degree of substitution.

In accordance with the present invention, there is further provided a cellulose ether having a specific substitution pattern, wherein the cellulose ether has:

(I) a partial degree of substitution in the C3 position of the anhydroglucose unit of the cellulose ether of $\geq 60\%$, based on the total degree of substitution; and (ii) a partial degree of substation in the C6 position of $\leq 15\%$, based on the total degree of substitution.

DETAILED DESCRIPTION OF THE INVENTION

Advantageously, stabilisers are added to the cellulose suspension which are intended to suppress or prevent degradation of both the cellulose and of the NMMNO. An example of a suitable stabiliser is propyl gallate, the amount of stabiliser being preferably 1 mass %, based on the amount of cellulose. As soon as a water content that corresponds approximately to NMMNO is obtained (13.3% water), the cellulose dissolves. The dissolved cellulose may than be etherified directly or preferably after dilution with a suitable dipolar aprotic organic solvent such as, for example, dimethyl sulfoxide (DMSO) or N-methyl pyrrolidone (NMP) or a protic medium such as an alcohol, e.g., n- or iso-propanol, n- or iso-butanol.

Etherification agents which have proved suitable for the process according to the invention are mainly etherification agents containing epoxy or vinyl groups such as, e.g., ethylene oxide, propylene oxide, epoxy propanol or acrylonitrile; vinyl ethyl ketone or vinylsulfonic acid may also be used. The process can also, however, be applied to etherification reactions with alkyl halides such as, e.g., monochloroacetic acid, monochloroacetate, methyl chloride, ethyl chloride or benzyl chloride. A crucial factor for the process according to the invention is the initiation or catalysis of the reaction with a solid phase catalyst. Said catalyst is brought into contact with the cellulose solution before and/or during and/or after the addition of the etherification agent and separated again after the reaction by filtration or by other known separation methods. The dissolution state of the cellulose in NMMNO is not impaired by this type of catalysis and the reaction takes place in the homogeneous polymer phase throughout the reaction period. Solid phase catalysts which have proved suitable in the system are insoluble basic substances, mainly strongly basic ion exchange resins, e.g., based on polystyrene, which are used preferably in spherical form with particle sizes from 0.2 to 3 mm and bear quaternary ammonium groups. The proposed process is not, however, limited to this group of solid phase catalysts. Prior to the reaction, the ion exchanger is activated in a known way by treatment with sodium hydroxide solution. The amounts of catalyst required are 0.01 to 1 mole, preferably 0.05 to 0.5 mole per mole of etherification agent. Depending on the type of reaction, however, it may also prove necessary to use the catalyst in equimolar quantities, based on the etherification agent. The reaction conditions are tailored to the etherification agent and the desired degree of substitution. The reaction temperatures may range from room temperature to 120° C. Reactions at 30 to 100° C. have proved advantageous, the required reaction times ranging from 5 min to about 24 h.

After the reaction, the cellulose ethers are isolated and purified by separation of the solid phase catalyst and precipitation of the cellulose ether with suitable precipitating agents such as, for example, ethanol, propanol, acetone or mixtures thereof, which are then also used advantageously for washing out the by-products.

In a special embodiment of the process, the solid phase catalyst is arranged in a stationary manner in a tubular reactor, e.g., on a sieve plate or several sieve plates and the cellulose solution to which the etherification agent has been added is pumped once or repeatedly through the catalyst layer at elevated temperature.

The etherification reagent may also be added continuously to the cellulose solution.

The contact times are from 5 min to 24 h, preferably 10 min to 6 h at reaction temperatures from 30 to 80° C., depending on the etherification agent and the desired degree of substitution. Isolation and purification of the resulting cellulose ethers from the polymer solution separated from the solid phase catalyst takes place after a precipitation step in a similar way to the batch process.

Although the use of insoluble ion exchangers for catalytic purposes is well known from the field of the organic chemistry of low molecular weight compounds and also for the catalytic cleavage of high molecular weight compounds, it was by no means obvious to catalyse homogeneous etherification reactions of cellulose in an extremely high-viscosity solution using basic ion exchangers.

The advantages of the process according to the invention consist mainly in the fact that:
1) using NMMNO as reaction medium, optionally in combination with suitable organic diluents, even high molecular weight types of cellulose in a high concentration may be etherified homogeneously without the addition of bases with a coagulating effect,
2) compared with commercial etherification processes, relatively small amounts of unwanted salts are obtained, if at all,
3) the chain length degradation of the cellulose during dissolution in the system, and the decomposition of NMMNO can be reduced during the etherification reaction by using suitable stabilisers and by avoiding or considerably reducing the addition of conventional bases such as, e.g. NaOH or quaternary ammonium bases,
4) completely soluble high-viscosity derivatives may be obtained even at low DS values,
5) compared with commercial cellulose ethers, novel products in terms of ion compatibility or thermal stability of aqueous solutions can be prepared,
6) on the one hand, a homogeneous distribution of the substituents in a broad DS range along and between the polymer chains, and on the other hand a regioselective insertion of functional groups in certain positions of the anhydroglucose unit takes place.

The homogeneous reaction of cellulose in NMMNO according to the invention in the presence of suitable solid phase catalysts is explained in more detail in the examples below.

The cellulose starting material used by way of example was a wood cellulose of the Ultraether F type with a limiting viscosity number $LVN_{cuen}=1215$, but celluloses such as, e.g., cotton, cotton linters or celluloses with various degrees of polymerisation may also be used.

Embodiments

EXAMPLE 1
Preparation of Hydroxypropyl Cellulose

A cellulose melt solution of 4.6 g of cellulose ($LVN_{cuen}=1215$) in 96 g of N-methylmorpholine-N-oxide monohydrate (NMMNO)—the abbreviation NMMNO always denotes the monohydrate of M-methylmorpholine-N-oxide-(0.046 g propyl gallate as stabiliser) is diluted with 20 ml of isopropanol at 85° C. with stirring and heated to 75° C. A previously prepared suspension of bead-shaped anion exchanger containing 7.5 g of dry substance (based on polystyrene with quaternary ammonium groups) in 30 g of NMMNO/8 ml of isopropanol is then added and stirred for 15 min. Then 20 ml of propylene oxide are added dropwise to the cellulose solution by way of a dropping funnel within 45 min at 75° C. with intensive stirring, and stirring is continued for 1 h. After separation of the solid phase catalyst, the hydroxypropyl cellulose is precipitated by pouring the polymer solution into three times the volume of a 75:25 acetone/ethanol mixture, washed with ethanol and dried.

After digestion with trifluoroacetic acid and high-resolution $^{13}$C-NMR analysis, the completely water-soluble hydroxypropyl cellulose had an MS=0.93; DS=0.63 (MS/DS ratio=1.47) with a substituent distribution of $C_2=0.07$, $C_3=0.49$ and $C_6=0.07$. The solution viscosity (Haake rotational viscometer) of a 2% aqueous solution at 20° C. and with a shear gradient of D=2.55 s$^{-1}$ was η=14000 mPa·s.

EXAMPLE 2

A solution of 4.6 g of cellulose in 96 g of NMMNO is diluted with 30 ml of DMSO at 100° C. with stirring and heated to 85° C. A previously prepared suspension of bead-shaped anion exchanger containing 6 g of dry substance (based on polystyrene with quaternary ammonium groups) in 30 ml of DMSO is then added and stirred for 15 min. Then 10 ml of propylene oxide are metered in the vapour phase into the colourless cellulose solution within 1 h and intensive stirring is continued for 3 h. The solid phase catalyst is separated from the amber-coloured hydroxypropyl cellulose solution by filtration, the derivative is precipitated by pouring said solution into three times the volume of a 75:25 acetone/ethanol mixture, washed with ethanol and dried.

After digestion with trifluoroacetic acid and high-resolution $^{13}$C-NMR analysis, the completely water-soluble hydroxypropyl cellulose had an MS=0.49; DS=0.35 (MS/DS ratio=1.4) with a substituent distribution of $C_2=0.05$, $C_3=0.20$ and $C_6=0.05$ and a solution viscosity in a 2% aqueous solution at 20° C. of η=6300 mPa·s with a shear gradient of D=2.55 s$^{-1}$.

EXAMPLE 3

Operations are carried out as in example 2 but the reaction is carried out at 75° C. and 20 ml of propylene oxide are added by way of a dropping funnel within 1.5 h.

The completely water-soluble hydroxypropyl cellulose had an MS=1.43; DS=1.01 (MS/DS ratio=1.4) with a substituent distribution of $C_2=0.01$, $C_3=0.92$ and $C_6=0.09$ and a solution viscosity in a 2% aqueous solution at 20° C. of η=2150 mPa·s with a shear gradient of D=2.55 s$^{-1}$.

An aqueous solution of this hydroxypropyl cellulose does not coagulate on heating to 100° C., unlike commercial products.

EXAMPLE 4

Operations are carried out as in example 3 at a reaction temperature of 75° C. but with N-methylpyrrolidone as diluent instead of DMSO, and 20 ml of propylene oxide are added by way of a dropping funnel within 1.5 h.

The completely water-soluble hydroxypropyl cellulose had an MS=0.48; DS=0.33 (MS/DS ratio=1.45) with a substituent distribution of $C_2=0.03$, $C_3=0.30$ without $C_6$ substitution and a solution viscosity in a 2% aqueous solution at 20° C. of η=11300 mPa·s with a shear gradient of D=2.55 s$^{-1}$.

EXAMPLE 5
Preparation of Hydroxyethyl Cellulose

A cellulose melt solution of 4.6 g of cellulose in 96 g of NMMNO is diluted with 30 ml of DMSO at 100° C. with stirring and heated to 65° C. Bead-shaped anion exchanger containing 7.5 g of dry substance in suspension in 30 ml of DMSO was then added and stirred for 15 min. Then 12.5 g of ethylene oxide are added to the cellulose solution from a pressure pump within 30 min at 65° C. The hydroxyethyl cellulose which is water-soluble after a reaction time of only 10 min was isolated after 1 h stirring by separating the solid phase catalyst from the polymer solution by centrifugation over a frit, precipitating the derivative by pouring said solution into three times the volume of a 75:25 acetone/ethanol mixture, washing with ethanol and drying.

The completely water-soluble hydroxyethyl cellulose had a DS=0.95 with $C_2=0.20$, $C_3=0.75$ and a solution viscosity in a 2% aqueous solution at 20° C. of η=2500 mPa·s with a shear gradient of D=2.55 s$^{-1}$.

EXAMPLE 6

Operations are carried out as in example 5 at a reaction temperature of 65° C. but with N-methylpyrrolidone as diluent instead of DMSO.

The completely water-soluble hydroxyethyl cellulose had a DS=0.7 with $C_2$=0.10, $C_3$=0.57 and a solution viscosity in a 2% aqueous solution at 20° C. of η=3200 mPa·s with a shear gradient of D=2.55 s$^{-1}$.

EXAMPLE 7
Preparation of Cyanoethyl Cellulose

A solution of 4.6 g of cellulose in 96 g of NMMNO is diluted with 30 ml of N-methylpyrrolidone at 100° C. with stirring and heated to 65° C. A previously prepared suspension of bead-shaped anion exchanger containing 7.5 g of dry substance in 30 ml of NMP is then added and stirred for 15 min. 15 ml of acrylonitrile are added within 3 min for cyanoethylation. After a reaction time of 15 min at 65° C., the solid phase catalyst is separated from the polymer solution by filtration, the derivative is precipitated by pouring said solution into three times the volume of a 75:25 acetone/ethanol mixture, washed with ethanol and dried.

The completely water-soluble cyanoethyl cellulose had a DS of cyanoethyl groups of 0.6 with a substituent distribution of $C_2$=0.2, $C_3$=0.32 and a solution viscosity in a 2% aqueous solution at 20° C. of η=5750 mPa·s with a shear gradient of D=2.55 s$^{-1}$

EXAMPLE 8
Preparation of Carboxymethyl Cellulose

A cellulose solution of 6 g of cellulose in 125 g of NMMNO melt (0.06 g propyl gallate as stabiliser) was diluted at 105° C. with 40 ml of DMSO. Monochloroacetic acid (MCA) as reagent and trimethylbenzylammonium hydroxide (Triton B) as co-catalyst were used for carboxymethylation. After heating to 65° C., 1.7 g of MCA dissolved in 10 ml of DMSO were added within 3 min with intensive stirring, then 6.15 g of Triton B in 20 ml of DMSO (15.4 ml of 40% aqueous Triton B dissolved in 20 ml of DMSO and 4 ml of water distilled off) were added dropwise in 30 min and the solution was stirred for 1 h at 65° C. Then 3.5 g of MCA as a solution in 20 ml of DMSO were added within 10 min, 12.3 g of Triton B dissolved in 40 ml of DMSO (31 ml of 40% aqueous Triton B dissolved in 40 ml of DMSO and 8 ml of water distilled off) were added within 10 min and then a previously prepared suspension of bead-shaped anion exchanger containing 7.5 g of dry substance in 30 ml of DMSO was added with intensive stirring. After two hours' stirring and after separation of the solid phase catalyst, the carboxymethyl cellulose was isolated by precipitation in 3 times the volume of ethanol, washing three times with ethanol, treatment with 0.5% of NaOH and ethanol containing 10% water for the quantitative conversion to Na—CMC, washing with neutralised methanol until the filtrate was Cl-free, followed by drying. After digestion with trifluoroacetic acid and high-resolution $^{13}$C-NMR analysis, the completely water-soluble Na—CMC has a DS=0.39 with a substituent distribution of $C_2$=0.12, $C_3$=0.26 and $C_6$=0.01 and has a solution viscosity in a 2% aqueous solution at 20° C. of η=41500 mPa·s with a shear gradient of D=2.55 s$^{-1}$.

EXAMPLE 9
Preparation of Carboxymethylhydroxypropyl Cellulose

A cellulose solution of 50 g of cellulose in 1600 g of NMMNO melt (0.5 g of propyl gallate as stabiliser) was diluted at 105° C. with 500 ml of DMSO. After heating to 65° C., 14.6 g of MCA dissolved in 53 g of DMSO were added with stirring within 20 minutes, then 51.7 g of Triton B in 130 g of DMSO were added dropwise in 1 hour and the solution was stirred for 1 hour at 65° C. Then 29.2 g of MCA as a solution in 100 g of DMSO were added within 15 min and 129 g of Triton B dissolved in 470 g of DMSO were added within 45 minutes and stirred for 2 hours. (A CMC sample taken from the batch had a $DS_{CMC}$=0.45 with a substituent distribution of $C_2$=0.10, $C_3$=0.35 without $C_6$ substitution.) A previously prepared suspension of bead-shaped anion exchanger containing 10 g of dry substance in 40 g of DMSO followed by 70 ml of propylene oxide were added to the reaction mix within 1.5 hours with intensive stirring for the purpose of hydroxypropylation. After two hours' stirring and after separation of the solid phase catalyst, the carboxymethylhydroxypropyl ether was isolated from the cellulose by precipitation in 3 times the volume of ethanol, washing three times with ethanol, treatment with 0.5% NaOH and ethanol containing 10% water for the quantitative conversion of the carboxymethyl groups to the Na salt form, washing with neutralised methanol until the filtrate was Cl-free, followed by drying. After digestion with trifluoroacetic acid and high-resolution $^{13}$C-NMR analysis, the completely water-soluble carboxymethylhydroxypropyl cellulose has an $MS_{PO}$=0.82, $DS_{PO}$=0.58 with a $C_6$ substituent proportion of about 0.1, and has a solution viscosity in a 2% aqueous solution at 20° C. of η=15500 mPa·s with a shear gradient of D=2.55 s$^{-1}$.

What is claimed is:

1. A cellulose ether with a specific substitution pattern, wherein said cellulose ether has a partial degree of substitution in the C3 position of the anhydroglucose unit of the cellulose of greater than or equal to 60%, based on the total degree of substitution.

2. The cellulose ether of claim 1 wherein said cellulose ether has a partial degree of substation in the C6 position of less than or equal to 15%, based on the total degree of substitution.

* * * * *